United States Patent [19]

Spinelli

[11] Patent Number: 5,032,647

[45] Date of Patent: Jul. 16, 1991

[54] PROCESS FOR MAKING HYBRID ACRYLIC STAR POLYMERS WITH POLYSILOXANE CORES

[75] Inventor: Harry J. Spinelli, Wilmington, Del.

[73] Assignee: E. I. Du Pont de Nemours and Company, Wilmington, Del.

[21] Appl. No.: 414,415

[22] Filed: Sep. 29, 1989

[51] Int. Cl.⁵ .............................................. C08F 30/08
[52] U.S. Cl. .............................. 525/326.5; 525/326.6; 525/383
[58] Field of Search ................... 525/326.5, 326.6, 383

[56] References Cited

U.S. PATENT DOCUMENTS

| | | | |
|---|---|---|---|
| 3,244,664 | 4/1966 | Zelinski et al. | 260/41.5 |
| 4,185,042 | 1/1980 | Verkouw | 525/332 |
| 4,304,881 | 12/1981 | Aoki et al. | 525/66 |
| 4,659,782 | 4/1987 | Spinelli | 525/293 |
| 4,721,750 | 1/1988 | Nakamura et al. | 525/326.5 |
| 4,847,328 | 7/1989 | Hutchins et al. | 525/107 |
| 4,886,862 | 12/1989 | Kuwamura et al. | 525/326.5 |

FOREIGN PATENT DOCUMENTS

90/09403  8/1990  European Pat. Off.

Primary Examiner—Melvyn I. Marquis
Attorney, Agent, or Firm—Charles J. Shoaf

[57] ABSTRACT

Hybrid star polymers with functional acrylic arms and crosslinked polysiloxane cores are made by a group transfer polymerization process followed by a polycondensation of substituent alkoxysilyl groups to form the cores.

10 Claims, No Drawings

PROCESS FOR MAKING HYBRID ACRYLIC STAR POLYMERS WITH POLYSILOXANE CORES

BACKGROUND OF THE INVENTION

This invention concerns a process for making star polymers having acrylic arms made by group transfer polymerization (GTP) and crosslinked polysiloxane cores formed by condensation reactions of one or more alkoxysilyl functional groups located in a block on one end of the arms.

A. Aoki et al., U.S. Pat. No. 4,304,881 (1981), prepared styrene/butadiene "living" polymers by anionic polymerization and then coupled them by reaction with silicon tetrachloride to produce a 4-arm star polymer having a silicon atom as a core as shown in Example 4.

H. T. Verkouw, U.S. Pat. No. 4,185,042 (1980), prepared a polybutadiene "living" polymer by anionic polymerization and then prepared a silicon-containing star with up to 3.1 arms by reacting the "living" polymer with gamma-glycidoxypropyltrimethoxysilane.

O. W. Webster, U.S. Pat. Nos. 4,417,034 (Nov. 22, 1983) and 4,508,880 (Apr. 2, 1985), and W. B. Farnham and D. Y. Sogah, U.S. Pat. No. 4,414,372 (Nov. 8, 1983) and U.S. Pat. No. 4,524,196 (June 18, 1985) showed that acrylic star polymers can be prepared via group transfer polymerization by coupling "living" polymer with a capping agent having more than one reactive site or by initiating polymerization with an initiator which can initiate more than one polymer chain. Initiators that could produce acrylic star polymers with up to 4 arms were demonstrated.

H. J. Spinelli, in U.S. Pat. Nos. 4,659,782 and 4,659,783 issued Apr. 21, 1987, teaches the preparation of acrylic star polymers with crosslinked cores and at least 5 arms, optionally having functional groups in the cores and/or the arms. Preferably GTP techniques are used to make the polymers.

R. P. Zelinski et al. in U.S. Pat. No. 3,244,664 describe a three-step process for coupling polymer chains involving (1) the preparation of an addition polymer having one or two terminal alkali metal atoms, then (2) reacting the alkali metal atoms with certain silicic compounds to give a polymer product containing reactive silicon-containing terminal groups, and in which reaction some coupling of molecules can occur, and then (3) further treatment of the product which can provide additional coupling. The polymers can be telechelic (a reactive group on each end of the molecule) or semi-telechelic (a reactive silicic group on only one end). Because of the nature of the process only one alkali metal atom, and therefore only one silicon atom or one silicic group, can be attached directly to any one end of the polymer molecule. The single silicon group per end limits the nature and extent of the subsequent coupling or crosslinking possible among the molecules.

An object of this invention is an improved process for making star polymers comprised of a crosslinked polysiloxane core with arms of linear acrylate and methacrylate polymers, and such polymers made thereby.

SUMMARY OF THE INVENTION

This invention provides an improved process for the preparation of a silicon-containing branched organic polymer including the steps of forming a linear addition arm polymer having a reactive multifunctional silicon-containing group as a substituent in an end portion of the molecules thereof, and then reacting the silicon-containing groups with each other to couple the polymer molecules with one another wherein the improvement comprises:

1) forming a linear acrylate and/or methacrylate block copolymer of molecules having two end portions by a group transfer polymerization process of acrylate and/or methacrylate monomers using a group transfer polymerization initiator in which one end portion of the copolymer molecules is formed containing as a substituent at least one crosslinkable polyalkoxysilyl group and the other end portion of the molecules is formed containing no crosslinkable polyalkoxysilyl substituent; and then 2) crosslinking the alkoxysilyl groups with one another among the copolymer molecules by a polycondensation reaction to form a copolymer having a crosslinked polysiloxy core and more than 4 linear polyacrylate and/or polymethacrylate arms attached thereto.

The number of siloxy substituents per arm and their degree of reaction with one another is selected to avoid gelation of the copolymer and provide a star copolymer having a finite number average molecular weight in order to facilitate its processing and use in combination with other polymer systems.

In the products of this invention the core contains at least one silicon atom for each arm. The arms are attached to the core by means of chemical bonds with one or more silicon atoms. The ratio of core silicon atoms to the number of arms preferably is within the range of 1:1 to 8:1, and more preferably 2:1 to 5:1. Preferred arm molecular weights prior to the condensation reaction are in the range of 1,000 to 20,000 number average molecular weight, Mn.

The arm polymers are prepared by a process in which the arm polymer is made to contain one or more silicon groups capable of undergoing a condensation polymerization reaction with each other to form a crosslinked polysiloxane. The silicon groups are contained in the group transfer initiator and/or in one or more monomer units at or near one end of the arm polymer, or in a block of monomer units near one end of the arm polymer molecule. The monomer units containing the reactive silicon group may be adjacent to one another, or separated from one another randomly in a block segment of the arm polymer.

Preferably the reactive alkoxysilyl groups are located in a segment of the arm polymer which consists of less than half of the monomer units of what the arm is comprised, and preferably less than 20% of the arm units in order to achieve star formation with the desired core structure while avoiding gelation and crosslinking of the copolymer in bulk to an infinite molecular weight.

Higher crosslinking density is achieved with one or more silicon containing polymer units at or adjacent to a terminal end of the arm molecule. A more open crosslink structure results when the silicon-containing monomer units are separated from one another by non-crosslinkable acrylate and methacrylate monomer units. In general, the more open the crosslink structure of the core, the greater the number of arms which can be condensed to form the core.

Arm polymers are made by a group transfer polymerization (GTP) process preferably of the type taught in U.S. Pat. No. 4,417,043 to Webster and in U.S. Pat. No. 4,659,782 to Spinelli. The disclosures of which are incorporated herein by reference.

The reactive core-forming silicon groups in the arm polymer prior to crosslinking are attached to the ester (i.e. alcoholate) portion of the acrylate or methacrylate monomer as for example in 3-(trimethoxy)silylpropyl methacrylate; or in the GTP initiator such as in 1-trimethylsiloxy-1-(3-trimethoxysilyl)propoxy-2-methyl propene. Both of these can be used together as well.

The reactive silicon groups are preferably of the formula —Si—(OR)$_3$ wherein R is hydrocarbyl, and preferably an aliphatic hydrocarbon group containing up to 5 carbon atoms.

After preparation of the arm polymers, the living polymer is quenched to remove the living GTP groups and, simultaneously therewith or subsequently, the crosslinkable silicon groups are crosslinked with one another by hydrolysis of the -OR groups to result in a crosslinked siloxane core structure. The term "crosslinkable" distinguishes the core-forming silicon groups from the group transfer-initiating groups which contain silicon such as in a trimethylsiloxy initiator group as opposed to a trialkoxysilyl crosslinkable group.

The resulting star polymers may be used as formed in solution or isolated for subsequent use.

The star polymers may be used as additives for liquid systems such as for rheology control or for incorporation into other polymers and resin systems to modify their properties.

Preferably, for making the arms of star polymers of the invention, the monomers have one carbon-carbon double bond polymerizable by a group transfer polymerization process selected from

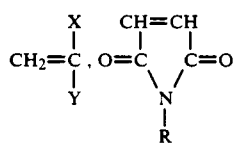

and mixtures thereof wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R''; each R$_1$ is independently selected from C$_{1-10}$ alkyl and C$_{6-10}$ aryl or alkaryl;

R is C$_{1-20}$ alkyl, alkenyl, or alkadienyl; C$_{6-20}$ cycloalkyl, aryl, alkaryl or aralkyl; any of said groups containing one or more ether oxygen atoms within aliphatic segments thereof; and any of all the aforesaid groups containing one or more functional substituents that are unreactive under polymerizing conditions; and each of R' and R'' is independently selected from C$_{1-14}$ alkyl.

Also preferably in the preparation of arm polymers of the invention, the "living" group transfer polymerization, (GTP), sites are (R$^1$)$_3$M- wherein:

R$^1$ is selected from C$_{1-10}$ alkyl and C$_{6-10}$ aryl or alkaryl; and

M is Si, Sn, or Ge.

In particular, suitable GTP processes and their mechanism are described in U.S. Pat. No. 4,659,782 at column 6, line 60 through column 9, line 20 which is incorporated herein by reference.

DETAILED DESCRIPTION OF THE INVENTION

To make hybrid star polymers of this invention, one first prepares acrylic arms by using a functional block copolymer prepared by GTP and then prepares a crosslinked, non-acrylic core by using some type of polysiloxane condensation crosslinking reaction involving a segment of the starting GTP block copolymer which contains the appropriate silicon group or groups. The self-stabilized particle which is thus produced has acrylic arms and a polysiloxane condensation core (hence the name "hybrid") as opposed to stabilized star polymer molecules which have acrylic arms and acrylic cores.

The differences between all-acrylic stars and the subject hybrid stars are primarily associated with the polysiloxy condensation core. The condensation core obtained in the hybrid process is less acrylic in nature than that produced in the all-acrylic process. Thus the swelling of the core or the sensitivity of the core to changes in solvent composition may take on characteristics more resembling polysiloxanes. This aspect can be important in using the solubility difference to control particle size during synthesis, and perhaps properties such as refractive index after the particle was made, or hardness and softness of the core depending on its crosslink density. The hardness/softness of the core can have an effect on impact resistance and toughness, especially when these hybrid stars are used in combination with various types of acrylic and non-acrylic plastics.

The size, polarity and hardness of the condensation core can be controlled by controlling the size of the starting functional segment together with the amount, type and functionality of the crosslinker which is used. The ability to use a previously isolated and characterized functional block copolymer, already containing the crosslinkable substituent, as the starting material for a hybrid star can be an advantage in that control over the final stabilized particle is not dependent on the existence of a "living" non-isolated intermediate (e.g., attached and unattached arms). The sequential nature of the process—production of the functional block copolymer first followed by formation of the stabilized particle—is important, however, it is not necessary to isolate the starting functional arm block copolymer in order to prepare a hybrid star, but isolation may sometimes provide an advantage.

The nature and composition of the acrylic arms can be controlled and varied as desired using the same techniques that are used for preparing the functinal segment of the block copolymers, or for the preparation of arms for all-acrylic stars.

Known uses of hydrocarbon stars together with the uses of all-acrylic stars are appropriate uses for the subject hybrid stars, with particular emphasis on the ability to control the particle size, polarity and energy-absorbing nature (hardness/softness) of the condensation core.

EXAMPLE 1

PMMA Star Made Using a Random Block of (Trialkoxy)-Silylpropyl Methacrylate (DP3) and MMA A 250 ml flask is equipped with mechanical stirrer, thermometer, nitrogen inlet, and addition funnels. The flask is charged with tetrahydrofuran (89.4 gm), methyl methacrylate (1.89 gm, 0.0189 mole), 3-(trimethoxy)-silylpropyl methacrylate (4.53 gm–0.0183 mole), p-xylene (1.2 gm), bis(dimethylamino)methyl silane (0.56 gm), and tetrabutylammonium m-chlorobenzoate (60 ul of a 1.0 M solution in acetonitrile). To this is added 1-trimethylsiloxy-1-methoxy-2-methyl propene (1.04 gm–0.006 mole) initiator. This starts the polymerization of the first block. A feed of tetrabutylammonium m-chlorobenzoate (60 ul of a 1.0 M solution in acetonitrile) and terahydrofuran (4.1 gm) is then started and added over 120 minutes. After 60 minutes, a feed of methyl methacrylate (57.55 gm, 0.576 mole) is started and added over 40 minutes. This generates a linear polymer that has a block of MMA at one end and a random block of MMA/3-(trimethoxy)silylpropyl methacrylate at the other end. The monomers are 99.9% converted. The molecular weight of this polymer is Mn=9,600 and Mw=12,600.

To the polymer solution is added water (4.5 gm), methanol (2.0 gm), and tetrabutylammonium fluoride (0.25 ml of a 1.0 M solution). This is refluxed for 2 hours. This results in a solution of a hybrid star polymer. The polymer has a cross-linked polysiloxane core, has a Mn=77,600 and Mw=391,000 and an average of at least about 30 arms of PMMA.

EXAMPLE 2

PMMA Star Made as in Example 1 with an Increased Amount of Silylpropyl Methacrylate A 250 ml flask is equipped with mechanical stirrer, thermometer, nitrogen inlet, and addition funnels. The flask is charged with tetrahydrofuran (90.5 gm), methyl methacrylate (1.75 gm, 0.0175 mole), 3-(trimethoxy)-silylpropyl methacrylate (7.33 gm–0.0296 mole), p-xylene (1.2 gm), bis(dimethylamino)methyl silane (0.56 gm), and tetrabutylammonium m-chlorobenzoate (60 ul of a 1.0 M solution in acetonitrile). To this is added 1-trimethylsiloxy-1-methoxy-2-methyl propene (0.97 gm–0.056 mole). This starts the polymerization of the first block. A feed of tetrabutylammonium m-chlorobenzoate (60 ul of a 1.0 M solution in acetonitrile) and terahydrofuran (4.1 gm) is then started and added over 120 minutes. After 60 minutes, a feed of methyl methacrylate (57.55 gm, 0.576 mole) is started and added over 40 minutes. This generates a linear polymer that has a block of MMA and a block of MMA/3-(trimethoxy)silylpropyl methacrylate. The monomers are 99.9% converted. The molecular weight of this polymer is Mn=12,400 and Mw=17,600.

To the polymer solution is added water (4.5 gm), methanol (2.0 gm), and tetrabutylammonium fluoride (0.25 ml of a 1.0 M solution). This is refluxed for 2 hours to quench the living polymer and to hydrolyze and crosslink the alkoxy-silyl groups. A star polymer having a crosslinked polysiloxane core is formed that has a Mn=205,000 and Mw=5,166,000 and an average of about 300 arms.

EXAMPLE 3

PMMA Star Made Using a Crosslinkable Silicon-Containing Initiator as Well as the Monomers of Examples 1 and 2

A 250 ml flask is equipped with mechanical stirrer, thermometer, nitrogen inlet, and addition funnels. The flask is charged with tetrahydrofuran (93.5 gm), methyl methacrylate (2.38 gm, 0.0238 mole), 3-(trimethoxy)-silylpropyl methacrylate (1.46 gm–0.0059 mole), p-xylene (1.2 gm), bis(dimethylamino)methyl silane (0.56 gm), and tetrabutylammonium m-chlorobenzoate (60 ul of a 1.0 M solution in acetonitrile). To this is added 1-trimethylsiloxy-1-(3-trimethoxysilyl)propoxy-2-methyl propene (1.76 gm–0.0055 mole). This starts the polymerization of the first block. A feed of tetrabutylammonium m-chlorobenzoate (60 ul of a 1.0 M solution in acetonitrile) and terahydrofuran (4.1 gm) is then started and added over 120 minutes. After 60 minutes, a feed of methyl methacrylate (57.2 gm, 0.572 mole) is started and added over 40 minutes. This generates a linear polymer that has a block of MMA/3-(trimethoxy)silylpropyl methacrylate and then a block of MMA. The monomers are 99.9% converted. The molecular weight of this polymer is Mn=9,600 and Mw=11,500.

To the polymer solution is added water (3.0 gm), methanol (4.0 gm), and tetrabutylammonium fluoride (0.25 ml of a 1.0 M solution). This is refluxed for 2 hours. A solution of a star polymer is formed that has a Mn=52,000 and Mw=186,000 and about 16 arms.

EXAMPLE 4

PMMA Star of Example 3 Using More Trimethoxy Silyl Monomer (DP3)

A 250 ml flask is equipped with mechanical stirrer, thermometer, nitrogen inlet, and addition funnels. The flask is charged with tetrahydrofuran (91.6 gm), methyl methacrylate (2.3 gm, 0.023 mole), 3-(trimethoxy)silylpropyl methacrylate (4.6 gm–0.0185 mole), p-xylene (1.2 gm), bis (dimethylamino)methyl silane (0.56 gm), and tetrabutylammonium m-chlorobenzoate (60 ul of a 1.0 M solution in acetonitrile). To this is added 1-trimethylsiloxy-1-methoxy-2-methyl propene (1.75 gm–0.0055 mole). This starts the polymerization of the first block. A feed of tetrabutylammonium m-chlorobenzoate (60 ul of a 1.0 M solution in acetonitrile) and terahydrofuran (4.1 gm) is then started and added over 120 minutes. After 60 minutes, a feed of methyl methacrylate (56.5 gm, 0.565 mole) is started and added over 40 minutes. This generates a linear polymer that has a 3-(trimethoxy)silylpropyl methacrylate and then a block of MMA. The monomers are 99.9% converted. The molecular weight of this polymer is Mn=10,300 and Mw=12,800.

To the polymer solution is added water (3.0 gm), methanol (4.0 gm), and tetrabutylammomnium fluoride (0.25 ml of a 1.0 M solution). This is refluxed for 2 hours. A star polymer is formed that has a Mn=129,000 and Mw=2,191,000 and about 170 arms per core.

EXAMPLE 5

PMMA Star Made Using a Block of the Silylpropyl Monomer (DP4)

A 250 ml flask is equipped with mechanical stirrer, thermometer, nitrogen inlet, and addition funnels. The flask is charged with tetrahydrofuran (91.0 gm), 3-(trimethoxy)silylpropyl methacrylate (5.68 gm–0.0229 mole), p-xylene (1.2 gm), bis(dimethylamino)methyl silane (0.30 gm), and tetrabutylammonium m-chlorobenzoate (80 ul of a 1.0 M solution of acetonitrile). To this is added 1-trimethylsiloxy-1-methoxy-2-methyl propene (0.86 gm–0.0049 mole). This starts the polymerization of the first block. A feed of tetrabutylammonium m-chlorobenzoate (80 ul of a 1.0 M solution in acetonitrile) and terahydrofuran (4.1 gm) is then started and added over 120 minutes. After 60 minutes, a feed of methyl methacrylate (53.45 gm, 0.535 mole) is started and added over 40 minutes. This generates a linear polymer that has a block of MMA (DP 109) and a block of 3-(trimethoxy)silylpropyl methacrylate.

The monomers are 99.9% converted. The molecular weight of this polymer is Mn=11,600 and Mw=18,600.

To the polymer solution is added water (2.45 gm), methanol (4.0 gm), and tetrabutylammonium fluoride (0.5 ml of a 1.0 M solution). This is refluxed for 2 hours. A star polymer is formed that has a Mn=164,000 and Mw=675,000 and about 36 arms per core of crosslinked polysiloxane.

EXAMPLE 6

MMA/EMA Star that Contains Hydroxyl Functionality and is Made Using a Random Block of Silylpropyl Methacrylate (DP5) and MMA in the Arms for Crosslinking A 500 ml flask is equipped with mechanical stirrer, thermometer, nitrogen inlet, and addition funnels. The flask is charged with tetrahydrofuran (73.4 gm), toluene (783.5 gm) methyl methacrylate (8.47 gm, 0.085 mole), 3-(trimethoxy)silylpropyl methacrylate (24.67 gm–0.100 mole), p-xylene (1.2 gm), bis(dimethylamino)-methyl silane (0.32 gm), and tetrabutylammonium m-chlorobenzoate (200 ul of a 1.0 M solution in acetonitrile). To this is added 1-trimethylsiloxy-1-methoxy-2-methyl propene (3.23 gm–0.0186 mole). This starts the polymerization of the first block. A feed of tetrabutylammonium m-chlorobenzoate (200 ul of a 1.0 M solution in acetonitrile) and terahydrofuran (4.1 gm) is then started and added over 120 minutes. After 60 minutes, a feed of methyl methacrylate (71.7 gm, 0.717 mole) and ethyl methacrylate (74.5 gm, 0.654 mole) is started and added over 40 minutes. Twenty minutes after the MMA/EMA feed is done 2-trimethylsiloxyethyl methacrylate (4.21 gm, 0.0208 mole) is added in one shot. This generates a linear polymer that has a block of MMA/3-(trimethoxy)silylpropyl methacrylate, a block of MMA/EMA, and a block of 2-hydroxyethyl methacrylate which is blocked with a trimethylsilyl group. The monomers are 99.9% converted. The molecular weight of this polymer is Mn=9,800.

To the polymer solution is added water (15.3 gm), methanol (10.0 gm), i-propanol (36.6 gm), and tetrabutylammonium fluoride (0.6 ml of a 1.0 M solution). This is refluxed for 2 hours. This removes the blocking group from the hydroxyethyl methacrylate and condenses the arms into a star. A star polymer having a crosslinked polysiloxane core and about 25 arms per core is formed that has a Mn=62,400 and Mw=480,000. The star has hydroxyl groups located in a segment at the ends of the MMA/EMA arms.

EXAMPLE 7

PMMA Star with 2000 MW Arms and Made Using a Trialkoxysilyl Group Only in the Initiator A 250 ml flask is equipped with mechanical stirrer, thermometer, nitrogen inlet, and addition funnels. The flask is charged with tetrahydrofuran (61.6 gm), p-xylene (1.2 gm), 1-trimethylsiloxy-1-3-(trimethoxysilyl)-propoxy-2- methyl propene (9.65 gm–0.30 mole), and tetrabutylammonium m-chlorobenzoate (150 ul of a 1.0 M solution in acetonitrile). A feed of tetrabutylammonium m-chlorobenzoate (150 ul of a 1.0 M solution in acetonitrile) and terahydrofuran (4.1 gm) is then started and added over 120 minutes. A feed of methyl methacrylate (60.1 gm, 0.601 mole) is started and added over 40 minutes. This generates a linear polymer that has one 3-(trimethoxy)silylpropoxy group at the end of a PMMA linear polymer. The monomers are 99.9% converted. The molecular weight of this polymer is Mn=1,900 and Mw=2,490.

To the polymer solution is added water (2.6 gm), methanol (4.0 gm), and tetrabutylammonium fluoride (0.25 ml of a 1.0 M solution). This is refluxed for 2 hours. A star polymer having a cross-linked polysiloxane core is formed that has a Mn=8,250 and Mw=11,000 and an average of about 4.4 arms per core.

EXAMPLE 8

PMMA Star with 10,000 MW Arms and Core Made Using Silicon Only for Crosslinking Initiator A 250 flask is equipped with mechanical stirrer, thermometer, nitrogen inlet, and addition funnels. The flask is charged with tetrahydrofuran (61.6 gm), p-xylene (1.2 gm), 1-trimethylsiloxy-1-3-(trimethoxysilyl)propoxy-2-methyl propene (1.98 gm–0.080 mole), and tetrabutylammonium m-chlorobenzoate (30 ul of a 1.0 M solution in acetonitrile). A feed of tetrabutylammonium m-chlorbenzoate (30 ul of a 1.0 M solution in acetonitrile) and terahydrofuran (4.1 gm) is then started and added over 120 minutes). A feed of methyl methacrylate (60.9 gm, 0.609 mole) is started and added over 40 minutes. This generates a linear polymer that has one 3-(trimethoxy)silylpropoxy group at the end of a PMMA linear polymer. The monomers are 99.9% converted. The molecular weight of this polymer is Mn=10,600 and Mw=11,700.

To the polymer solution is added water (0.8 gm), methanol (1.3 gm), and tetrabutylammonium fluoride (0.03 ml of a 1.0 M solution). This is refluxed for 2 hours. A star polymer is formed that has a Mn=47,800 and Mw=58,100 and an average of about 5 arms per core.

I claim:

1. An improved process for the preparation of a silicon-containing branched organic polymer including the steps of forming a linear addition arm polymer having a polyalkoxysilyl group as a substituent in an end portion of the molecules thereof, and then reacting by polycondensation the polyalkoxysilyl groups with each other to couple the polymer molecules with one another wherein the improvement comprises:
   1) forming a linear acrylate and/or methacrylate block copolymer of molecules having two end portion by a group transfer polymerization process of acrylate and/or methacrylate monomers using a group transfer polymerization initiator in which one end portion of the copolymer molecules is formed containing as a substituent at least one crosslinkable polyalkoxysilyl group and the other end portion of the molecules is formed containing no crosslinkable polyalkoxysilyl substituent; and then
   2) crosslinking the alkoxysilyl groups with one another among the copolymer molecules by a polycondensation reaction to form a copolymer having a crosslinked polysiloxy core and more than 4 linear polyacrylate and/or polymethacrylate arms attached thereto.

2. A process of claim 1 wherein the group transfer polymerization initiator contains a crosslinkable trialkoxysilyl group.

3. A process of claim 2 wherein an acrylate and/or methacrylate monomer, in addition to the initiator, contains a crosslinkable trialkoxysilyl group.

4. A process of claim 1 wherein at least one acrylate and/or methacrylate monomer other than the initiator contains a crosslinkable trialkoxysilyl group.

5. A process of claim 4 wherein the arm polymer is formed having in one end portion thereof at least two crosslinkable trialkoxysilyl groups.

6. A process of claim 5 wherein the arm polymer is formed having an average of from 2 to 5 crosslinkable trialkoxysilyl substituents in each molecule.

7. A process of claim 1, 2, 3 or 4 wherein the polyalkoxysilyl group is of the formula —Si(OR)$_3$ wherein R is methyl.

8. A process of claim 1 or 5 wherein the methacrylate monomer comprises 3-(trimethoxy)silylpropyl methacrylate.

9. A process of claim 1 or 5 wherein the group transfer polymerization initiator is 1-trimethylsiloxy-1-(3-trimethoxysilyl)propoxy-2-methyl propene.

10. A process of claim 1 wherein the methacrylate monomer comprises 3-(trimethoxy)silylpropyl methacrylate and the group transfer polymerization initiator is 1-trimethylsiloxy-1-(3-trimethoxysilyl)propoxy-2-methyl propene.

* * * * *